US008390999B2

(12) United States Patent
Neal et al.

(10) Patent No.: US 8,390,999 B2
(45) Date of Patent: Mar. 5, 2013

(54) COOLING A COMPUTING DEVICE

(75) Inventors: Thomas Neal, Cupertino, CA (US);
Robert Throop, Cupertino, CA (US);
Ken Robertson, Cupertino, CA (US)

(73) Assignee: Hewlett-Packard Development, L.P., Houston, TX (US)

( * ) Notice: Subject to any disclaimer, the term of this patent is extended or adjusted under 35 U.S.C. 154(b) by 1252 days.

(21) Appl. No.: 11/584,126

(22) Filed: Oct. 20, 2006

(65) Prior Publication Data
US 2008/0094795 A1 Apr. 24, 2008

(51) Int. Cl.
*H05K 7/20* (2006.01)
*F28F 7/00* (2006.01)
*H01L 23/34* (2006.01)
*F04D 29/54* (2006.01)

(52) U.S. Cl. ............... 361/679.49; 361/679.5; 361/695; 361/697; 454/184; 165/80.2; 257/718; 174/16.3; 415/206

(58) Field of Classification Search .............. 361/694, 361/695, 687, 697, 679.48–679.51; 454/184; 312/236; 415/206; 257/718–719; 174/16.3
See application file for complete search history.

(56) References Cited

U.S. PATENT DOCUMENTS

| 5,936,836 | A | * | 8/1999 | Scholder | 361/695 |
| 6,002,586 | A | * | 12/1999 | Chen et al. | 361/695 |
| 6,113,485 | A | * | 9/2000 | Marquis et al. | 454/184 |
| 6,130,820 | A | * | 10/2000 | Konstad et al. | 361/695 |
| 2005/0276015 | A1 | * | 12/2005 | Wong | 361/687 |
| 2007/0117502 | A1 | * | 5/2007 | Kim | 454/139 |

* cited by examiner

*Primary Examiner* — Zachary M Pape

(57) ABSTRACT

Various technologies for cooling a computer system are described. In accordance with one described embodiment, a fan assembly system for a computer comprises a fan operable for cooling the computer and a fan duct coupled with the fan. The fan duct comprises a number of attaching features. The fan is suspended at least one component of the computer. Moreover, the suspended fan enables air to flow between the fan and the component (e.g., a heatsink) to facilitate cooling of the component.

17 Claims, 11 Drawing Sheets

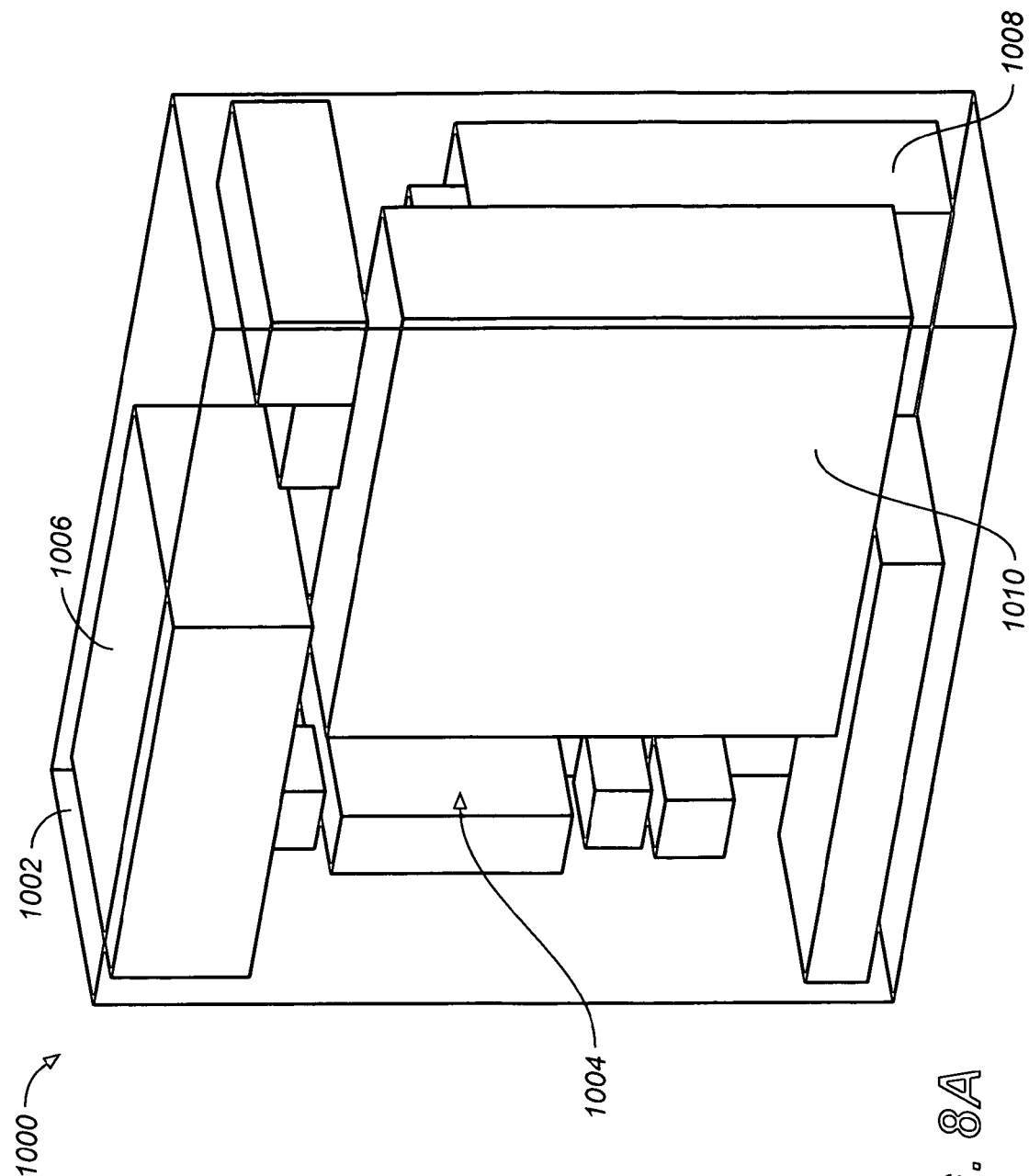

COOLING A COMPUTING DEVICE

BACKGROUND

Due to the advancement in the computer industry, computing devices (e.g., personal computers) have been getting smaller in size and at the same time generating more heat. As a result, effective cooling for computing devices is becoming increasingly important. This is especially true for small form factor (SFF) computers. In general, SFF computers refer to a class of computers that use motherboards significantly smaller than the standard Advanced Technology Extended (ATX) sized motherboards. By using smaller motherboards, such as micro-ATX motherboards, the overall form factor of a computer can be reduced.

Because the small size of SFF computers introduces additional constraints, traditional cooling systems are unable to provide adequate cooling for SFF computers. Thus, maintaining a SFF computer being operated under a working temperature is challenging. For example, since the components within a SFF computer are tightly packed because of its size, less space is left for air to flow through. Traditional cooling systems not configured to function within a SFF environment may not be able to effectively direct air flow in the more confined space.

Moreover, traditional cooling systems generate significant amounts of noise. As SFF computers are often placed in proximity to a user (e.g., placed on a desk), the noise issue renders traditional cooling systems unsuitable.

Furthermore, in order to meet various business demands, it is often desired that a SFF computer is designed to be operable under different orientations. In one example, a user may place a SFF computer horizontally on his or her desk. In another example, a user may place a SFF computer vertically on a wall. Unfortunately, conventional cooling systems often cannot adapt to different orientations and can only properly function when a SFF computer is situated in a default orientation.

BRIEF DESCRIPTION OF THE DRAWINGS

FIGS. 8A and 8B jointly illustrate a computer having a fan assembly, in accordance with a particular embodiment.

DETAILED DESCRIPTION OF THE DRAWINGS

Reference will now be made in detail to embodiments of the present claimed subject matter, examples of which are illustrated in the accompanying drawings. While the claimed subject matter will be described in conjunction with these embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the appended claims. Furthermore, in the following detailed description of the present claimed subject matter, numerous specific details are set forth in order to provide a thorough understanding of the present claimed subject matter. However, it will be evident to one of ordinary skill in the art that the present claimed subject matter may be practiced without these embodiment specific details In contrast to conventional cooling systems, embodiments of the present invention meet the needs of SFF computers. Embodiments enable a SFF computer to be effectively cooled despite its apparent relative paucity of airflow pathways. Further, some embodiments enable a SFF computer to be effectively cooled while operating in different orientations. In further embodiments, a fan is securely suspended over a chipset heat sink of the computer and is not prone to excessive vibrations that cause noise. As a result, the SFF computer is cooled in a relatively noise-free manner.

Figure 1A:
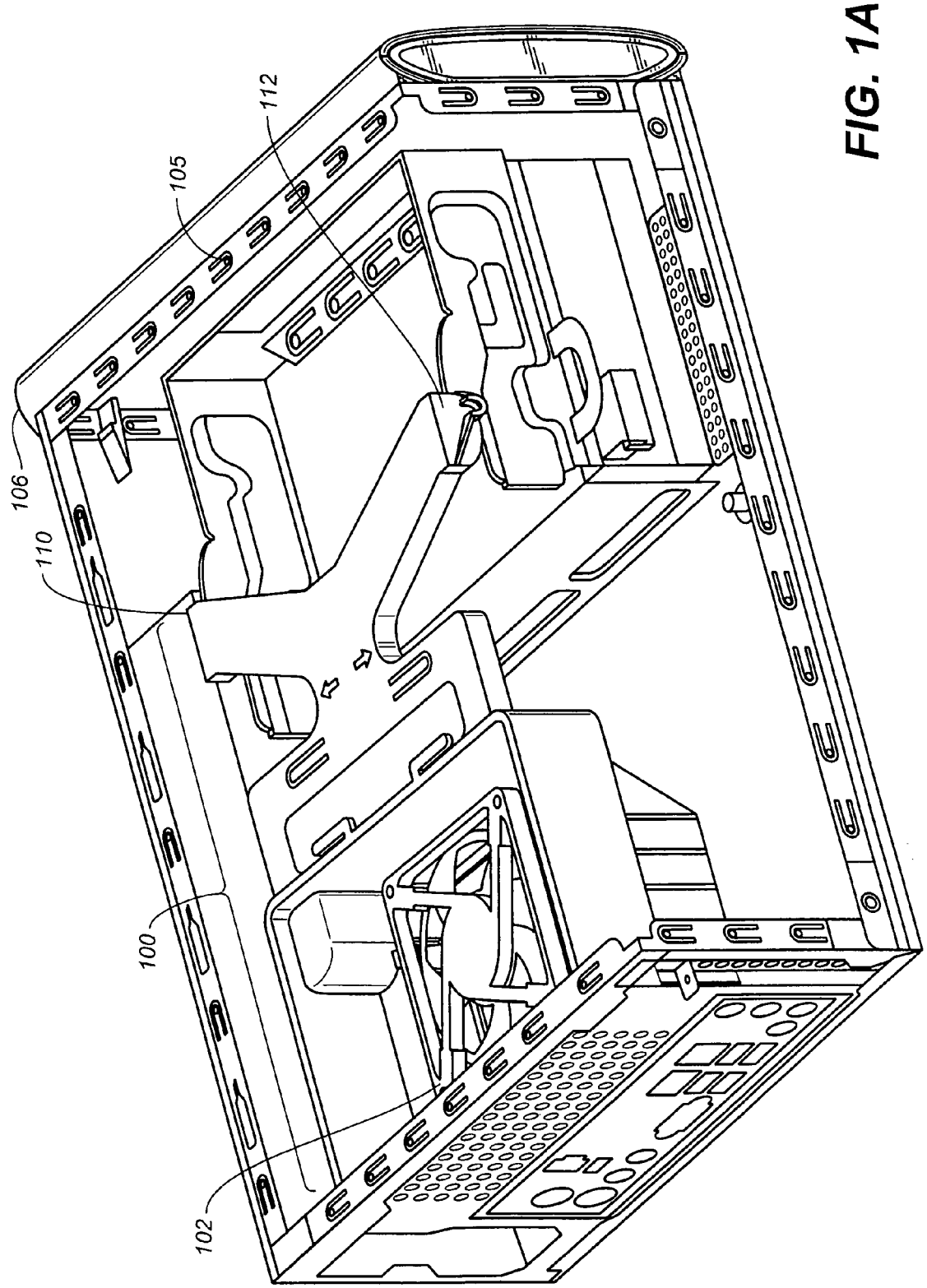
FIGS. 1A and 1B illustrate a computer with and without a fan assembly system, in accordance with a particular embodiment.
Figure 1B:
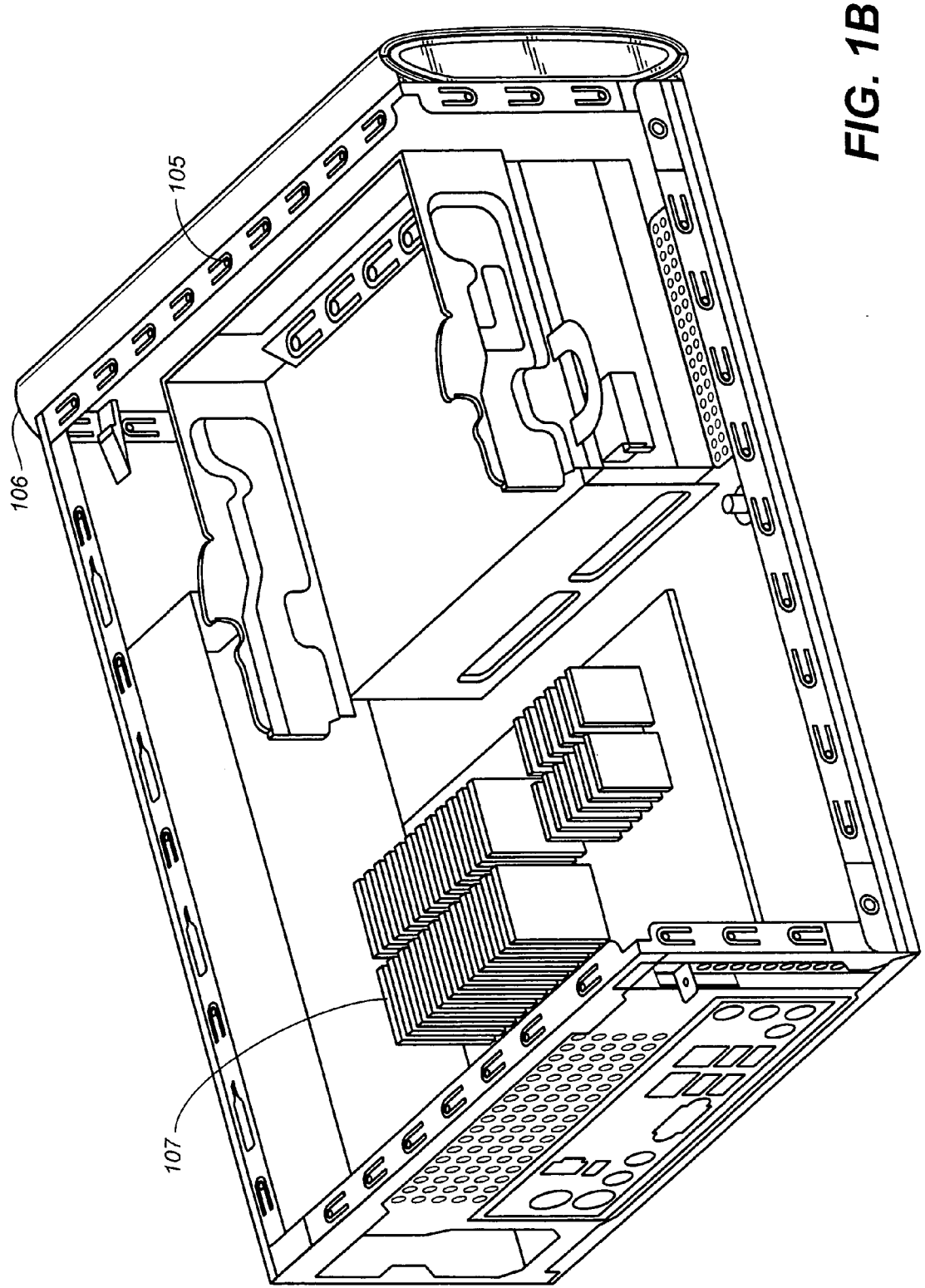

FIGS. 1A and 1B illustrate a computer 106 with and without a fan assembly system, in accordance with a particular embodiment. With reference to FIG. 1A, the fan assembly system resides within housing 105 of computer 106 and comprises a fan duct 100 (e.g., a generally Y-shaped fan duct) and a fan 102. It is appreciated that the fan duct 100 can be a generally Y-shaped fan duct, a generally U-shaped fan duct, or a generally U-shaped fan duct. The fan 102 is operable for cooling the computer 106. In some embodiments, the fan 102 is coupled with the fan duct 100. In one particular embodiment, the fan 102 is situated substantially apart from side panels of computer 106, which helps to contain and minimize the noise produced by fan 102. In one example, the fan duct 100 and the fan 102 are located within a centralized position of the housing 105 and not touching any of the side panels of computer 106. Also, in one particular embodiment, a processor having lower power consumption (e.g., a notebook processor) is utilized to reduce the amount of heat generated by computer 106.

In one embodiment, the fan assembly system is suspended over a component, such as a chipset heatsink, that resides within the housing 105. FIG. 1B provides an illustration of the components that are located under the fan assembly system (i.e., fan assembly has been removed to better illustrate components that could be beneath the fan). An embodiment of the heatsink 107 is shown in FIG. 1B. The fan assembly system, when attached, is suspending over heatsink 107. In one example, the suspended fan assembly system does not come in contact with heatsink 107. In one embodiment, air flow is provided by fan 102 and directed through the space between the suspended fan assembly system and the heatsink 107 to facilitate cooling of heatsink 107.

In one example, the fan duct 100 (e.g., a generally U-shaped fan duct) comprises a number of attaching features (e.g., a latch, an indent, and/or other types of attaching mechanisms) that, when engaged, position the fan between a front portion and a rear portion of the housing 105 of the computer 106. In one example, the fan duct 100 is securely coupled with the computer 106 via attaching features 112 and 110.

Figure 2:
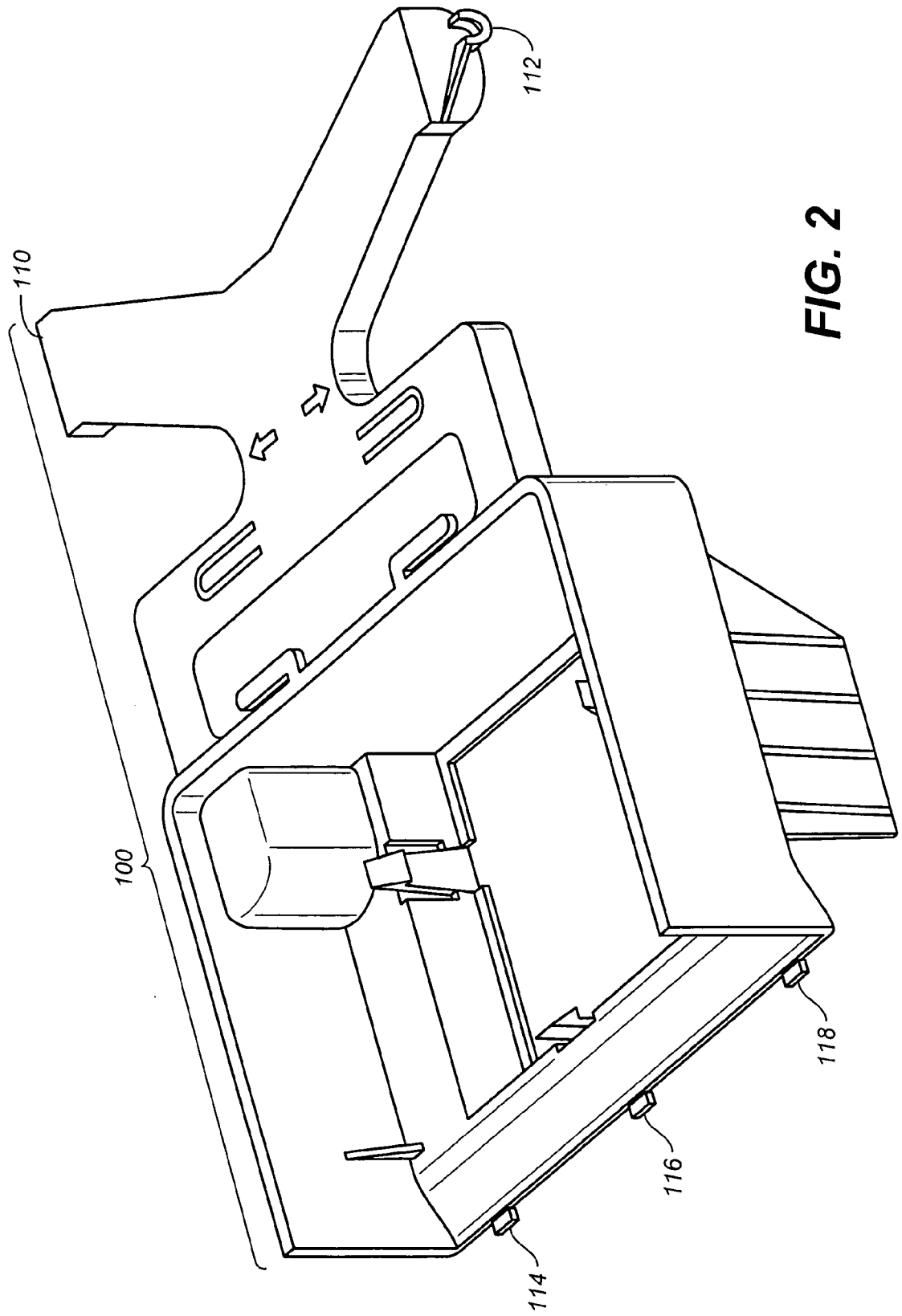
FIG. 2 illustrates a perspective view of the top surface of the fan duct, in accordance with a particular embodiment.
Figure 3:
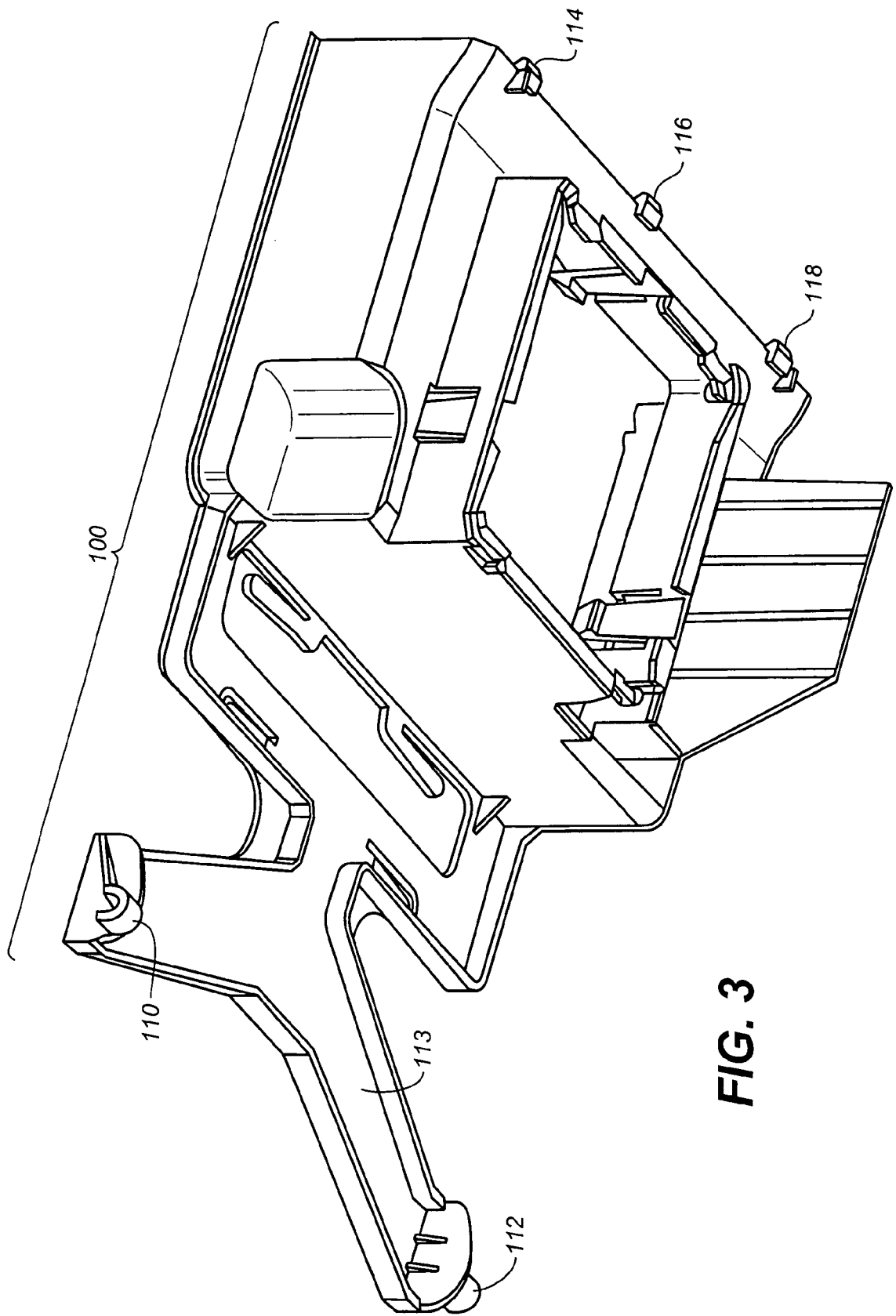
FIG. 3 illustrates a perspective view of the bottom surface of the fan duct, in accordance with a particular embodiment.

Apart from the computer 106, a perspective view of the top of the fan duct 100 is also independently illustrated in FIG. 2. FIG. 2 shows that fan duct 100 (e.g., a generally V-shaped fan duct), in addition to attaching features 110 and 112, in one example, is also equipped with attaching features 114, 116, and 118. Attaching features 114,116, and 118 work in conjunction with attaching features 112 and 110 to further secure the fan duct 100 with the computer 106. In one example, attaching features 112 and 110 engage with one or more front features of computer 106. Correspondingly, attaching features 114, 116, and 118 engage with one or more rear features of computer 106. A perspective view of the bottom of the fan duct 100 is illustrated in FIG. 3. FIG. 3 shows that the bottom of the fan duct 100 is hollow. In some examples, the fan duct is attached to a computer component, such as a hard disk drive. When a fan of a fan assembly system is running, a portion of the airflow from the fan may flow along the hollow region 113 towards the computer component to facilitate cooling of the computer component.

Also, although the computer 106 and the fan assembly system are shown and described as having certain numbers and types of elements, the present claimed subject matter is not so limited; that is, computing device 100 and/or the fan assembly system may include elements other than those shown, and/or may include more than one of the elements that are shown. For example, the fan duct 100 may comprise more or fewer attaching features than those shown.

In one particular embodiment, the fan duct 100 is secured within the housing 105 (also referred to as an enclosure) using multiple attaching features. In one example, by using multiple attaching features, the fan duct 100 is more securely mounted and the fan 102 can function while causing less vibration as well as less noise.

In some embodiments, the fan duct 100 is flexible. Fan duct 100 is constructed of a flexible material to absorb vibrations and further reduce noise level. In some examples, a fan duct 100 has flexible bow-shaped structure to provide an easy snap-on installation. In one particular embodiment, the fan duct 100 is installed by applying an initial compressive force to the fan duct 100. Once the fan duct 100 is slight compressed and positioned properly within the computer 106, the compression force can be released; the fan duct 100 then expands and engages its attaching features to snap lock fan duct 100 into place. Furthermore, the bow-shaped structure of fan duct 100 enables the fan duct 100 to exert a compressive force on the attaching features; the fan duct 100 thus fits more securely, vibrates less and generates less noise.

In some embodiments, when the fan assembly system is installed within the computer 106, the fan 102 is suspended over a chipset heat sink (e.g., 107 of FIG. 1B) of the computer 106. The suspended fan 102 is able to efficiently draw heat away from the chipset heat sink and direct it away from the computer 106. In one embodiment, the heat is pushed out through a rear vent of the computer 106 and dissipated into the surrounding air.

Figure 4:
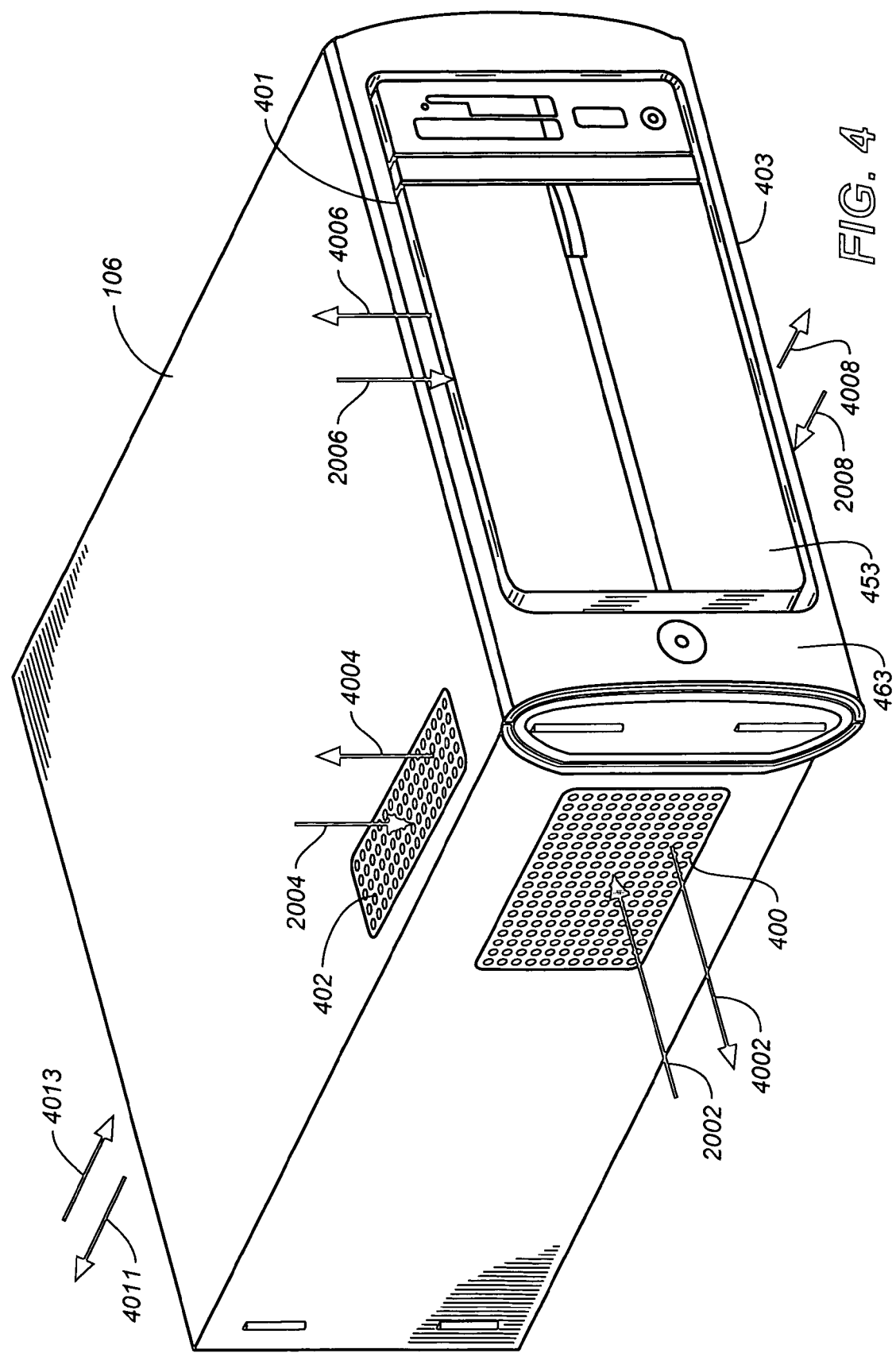
FIG. 4 illustrates a number of vents and airflow pathways that facilitate cooling of a computer situated in a horizontal position, in accordance with a particular embodiment.

FIG. 4 illustrates a number of vents and airflow pathways that facilitate cooling of computer 106 when it is situated in a horizontal position. FIG. 4 is a perspective view that shows computer 106 resting on its side (as opposed to top or bottom). Vents 400 and 402 are located substantially orthogonal to one another and enable air to flow in via airflow pathways 2002 and 2004 respectively. Also, vents 400 and 402 enable air to flow out via airflow pathways 4002 and 4004 respectively. In some embodiments, a narrow opening of space exists between the front bezel 453 and the front portion of the housing 463. This opening of space defines vent 401 and vent 403. Shown as darkened regions between the front bezel 453 and the front portion of the housing 463, vents 401 and 403 enable air to flow in via airflow pathways 2006 and 2008. Also, vents 401 and 403 enable air to flow out via airflow pathways 4006 and 4008. Moreover, air can flow in or out from the rear of the computer 106 via airflow pathways 4013 or 4011. Also, although vents 400, 401, 402, and 403 can be used as intake vents, the vents 400, 401, 402, and 403 are not limited in this way. In fact, the vents 400, 401, 402, and 403 provide bidirectional pathways. In other words, air from within the computer 106 may flow in as well as out via the vents 400, 402, 401, and 403. Heat is dissipated via vents 400, 401, 402, and 403 into the surrounding air.

Figure 5:
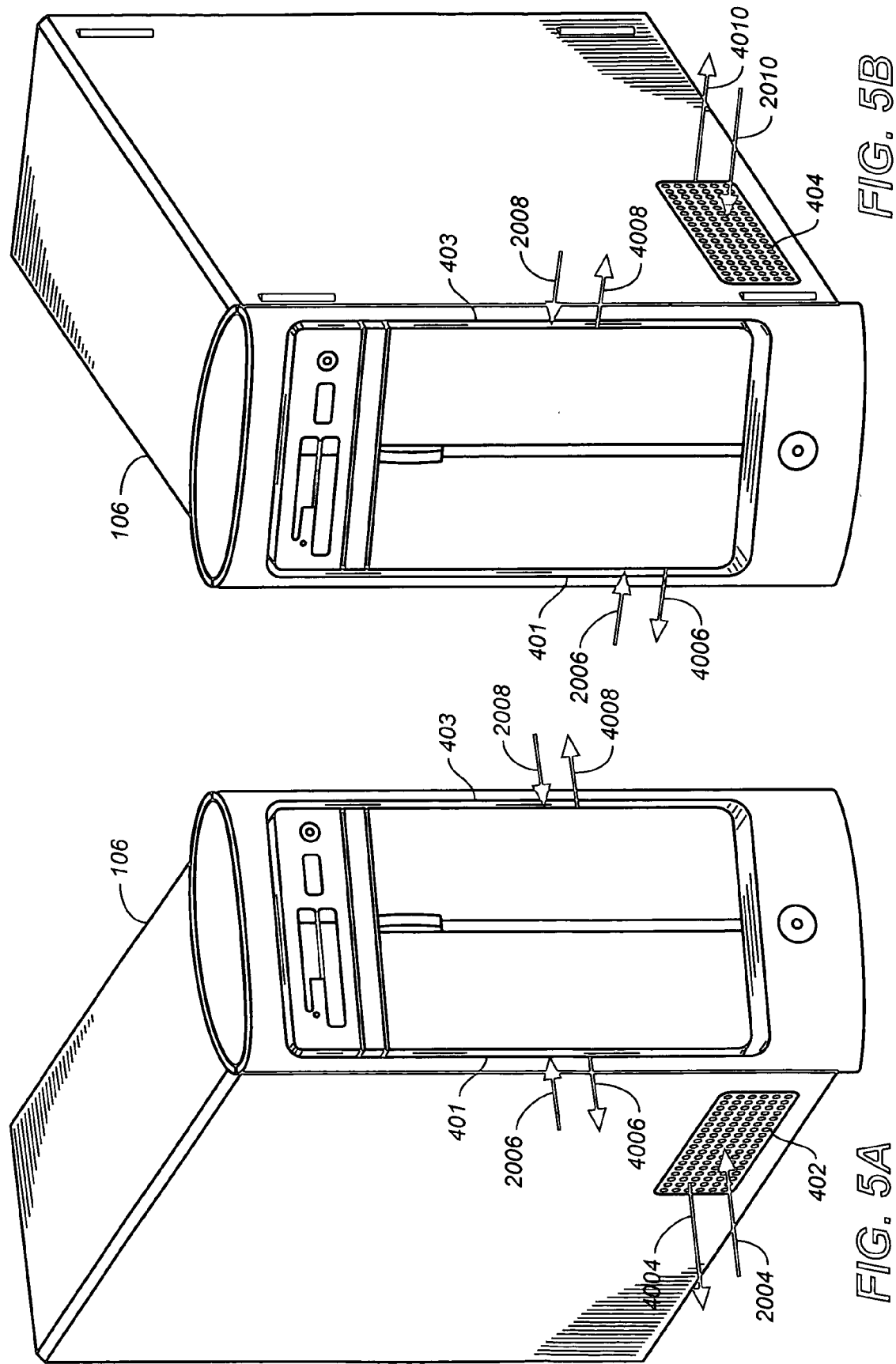
FIGS. 5A and 5B illustrate additional vents and airflow pathways that facilitate cooling of computer situated in a vertical position, in accordance with a particular embodiment.

FIGS. 5A and 5B illustrate exemplary vents and airflow pathways that facilitate cooling of computer 106 when it is situated in a vertical position. FIG. 5A shows vents 401, 402, and 403. The counterpart of vent 402 (e.g., a side vent), vent 404 is shown in FIG. 5B. Again, vents 401 and 403 enable air to flow in via airflow pathways 2006 and 2008. Also, vents 401 and 403 enable air to flow out via airflow pathways 4006 and 4008. Similarly, vents 402 and 404 enable air to flow in via airflow pathways 2004 and 2010. Also, vents 402 and 404 enable air to flow out via airflow pathways 4004 and 4010. The vents 401, 402, 403, 404 provide bidirectional pathways; air flows in via these vents as well as out. The existence of multiple vents on the different surfaces of computer 106 provides improved air circulation. In other words, the total amount of air that flows in and out of the computer 106 is increased significantly. Consequently, computer 106 is able to perform a more efficient thermal exchange with the surrounding air to cool its internal components.

Furthermore, by having a multitude of vents, FIGS. 4, 5A, and 5B jointly illustrate that particular embodiments are capable of cooling effectively under different orientations. Again, it is important to note that FIG. 4 is a perspective view of a computer 106 resting on its side. In contrast, FIGS. 5A and 5B illustrate computer 106 in an upright position. Particular embodiments illustrated need not be placed in one fixed default position to achieve efficient cooling. The multitude of vents shown in FIGS. 4, 5A, and 5B demonstrate that particular embodiments can be efficiently cooled while alternately situated in at least a horizontal position and a vertical position. Also, other embodiments can be efficiently cooled while situated in different ways and are not limited to the positions shown in FIGS. 4, 5A, and 5B.

Figure 6:
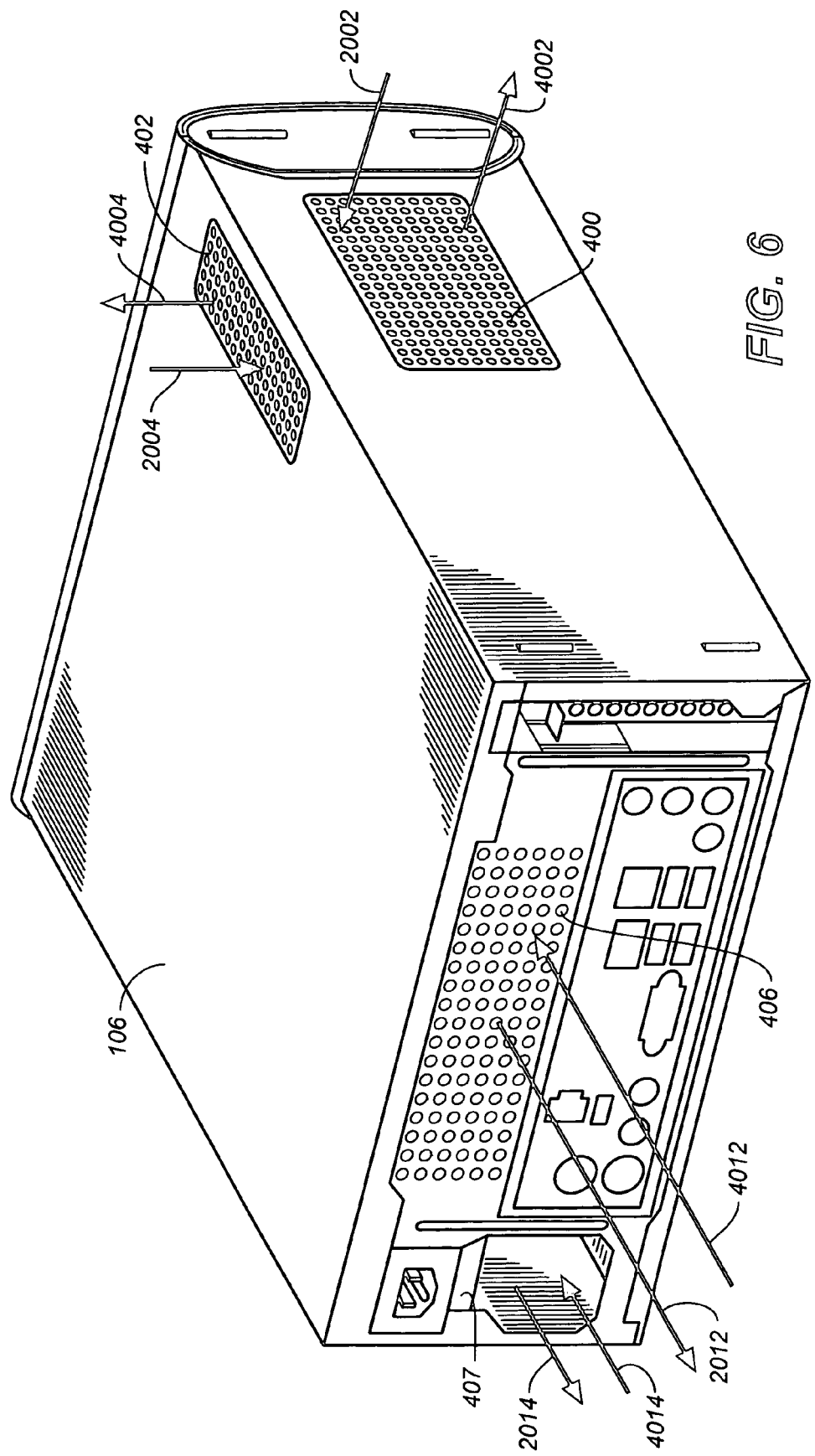
FIG. 6 illustrates additional vents situated on the rear portion of a computer that provides additional airflow pathways, in accordance with a particular embodiment.

FIG. 6 illustrates additional vents 406 and 407 situated on the rear portion of computer 106 that provides additional airflow pathways 2012 and 2014 that direct air away from the computer 106. Also, vents 406 and 407 provide airflow pathways 4012 and 4014 that directs air into the computer 106. Moreover, vent 402 provides airflow pathway 4004 that directs air away from computer 106 and airflow pathway 2004 that directs air into computer 106. Also, vent 400 provides airflow pathway 2002 that directs into computer 106 and airflow pathway 4002 that directs air away from computer 106. In one example, the general direction of air flow is from the front portion of the computer 106 to the rear portion of the computer 106; the air exits via the rear vents 406 and 407. In another example, air that enters computer 106 via airflow pathway 2004 exits via airflow pathway 4002. In yet another example, air that enters computer 106 via airflow pathway 4012 exits via airflow pathway 4004. In still another example, air that enters computer 106 via airflow pathway 2002 exits via airflow pathway 2014. Additionally, it is important to note that air may enter and exit computer 106 via different paths.

In one particular embodiment, vent 406 comprises a number of evenly spaced hexagonal perforations. However, vent 406, as well as other vents (e.g., vents 400, 401, 402, 403, and 404) may be differently shaped. In one example, the vents comprise circular perforations. In another example, a vent is essentially mesh-like. In yet another embodiment, the vents comprise narrow rectangular slits. The vents can be constructed of metallic, plastic, and/or other types of materials.

Figure 7:
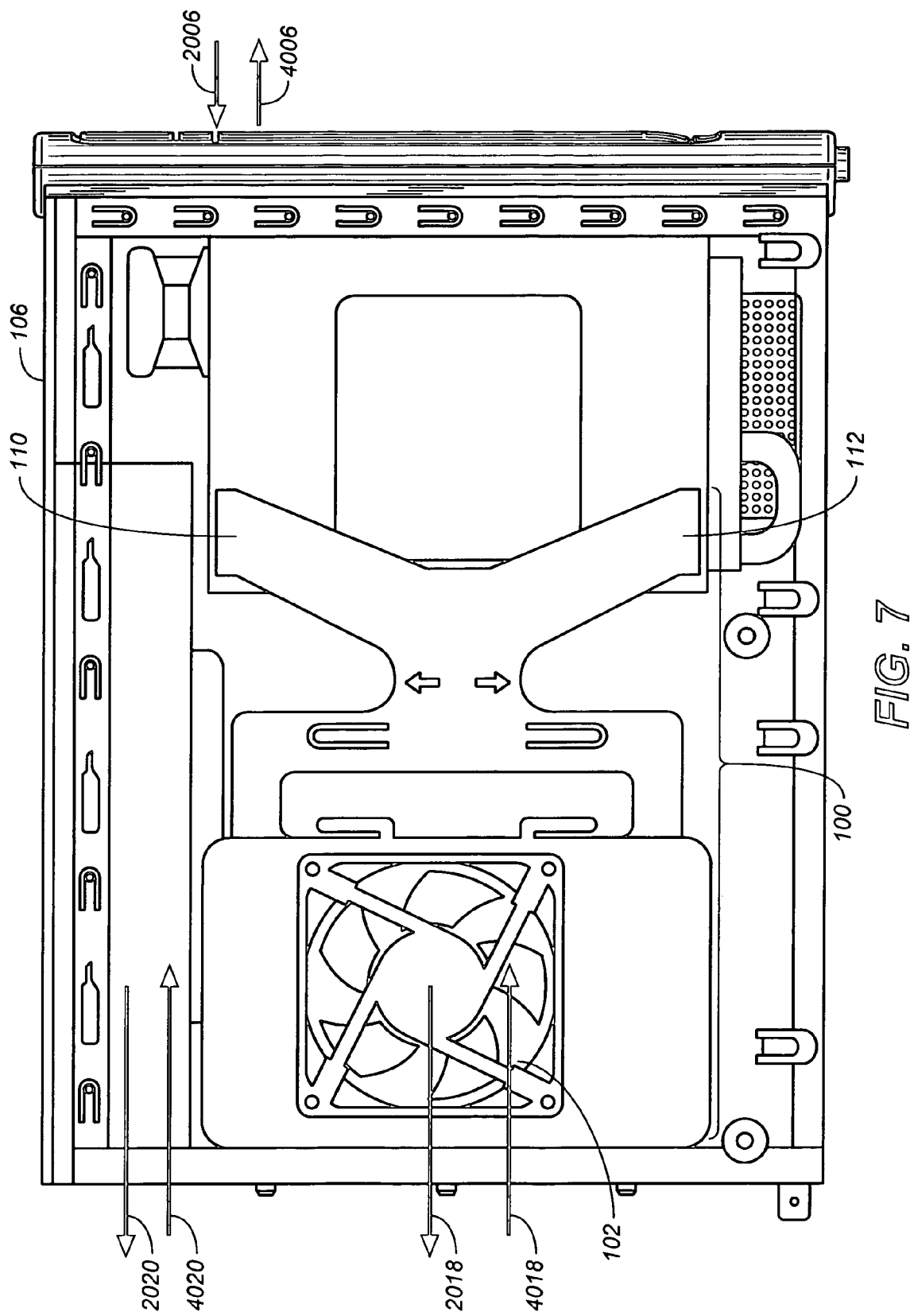
FIG. 7 illustrates a side view of one particular airflow pattern through computer, in accordance with a particular embodiment.

FIG. 7 illustrates a side view of one particular airflow pattern through computer 106. Airflow pathways 2020 and 2018 show that air travels in a general direction from the front portion of the computer 106 towards the rear portion of the computer 106. Upon arriving at the rear portion, the air exits via one or more rear vents. Specifically, in one example, air enters computer 106 via airflow pathway 2006 and exist via airflow pathways 2020 and 2018. Although the general direction of airflow, in some examples, is from the front portion of the computer 106 towards the rear portion of the computer 106, it is not implied that the airflow exchange is limited in this way. In some examples, airflow is bidirectional and air enters computer 106 via airflow pathways 4020 and 4018. Specifically, in one example, air enters computer 106 via airflow pathways 4018 and 4020 and exits via airflow pathway 4006.

Figure 8B:
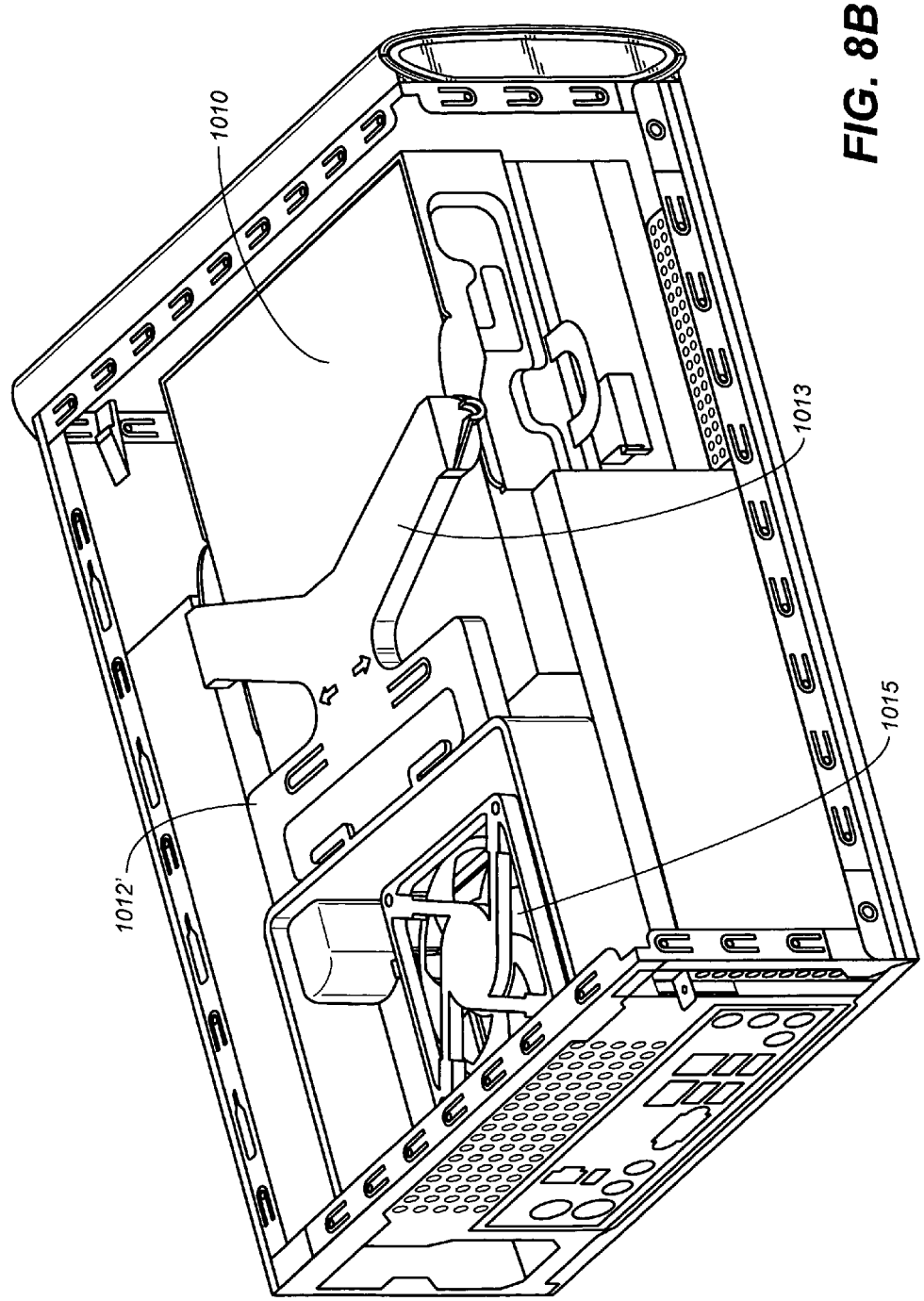

FIGS. 8A and 8B jointly illustrate a computer 1000, in accordance with one particular embodiment. The computer 100 comprises a housing 1002, a motherboard 1004 (e.g., an Integrated Technology Extended (ITX) motherboard and/or a micro ATX motherboard) located toward a rear region of the housing 1002, and an internal power supply 1006 located toward a top region of the housing 1002.

The computer 1000 also comprises a hard disk drive 1008 located toward a side region of the housing 1002, an optical disk drive 1010 located toward another side region of the housing 1002, and a fan assembly 1012 (shown in FIG. 8B) coupled with the optical disk drive 1010. In one example, when installed within the computer 1000, the fan assembly 1012 is suspended over a chipset heat sink of the computer 1000. The suspended position of the fan assembly 1012 effectively directs heat away from the chipset heat sink towards one or more vents of the computer 1000. Also, in one example, the fan assembly 1012 is attached to the optical disk drive 1010. In some examples, the fan duct 1013 of the fan assembly 1012 has a hollow undersurface, and when the fan 1015 is operating, air is directed from the fan through the fan duct 1013 towards the optical disk drive 1010 to facilitate cooling of the optical disk drive 1010. Also, it is appreciated that the fan duct 1013 could be a tube or an enclosed channel.

Furthermore, in some embodiments, the computer 1000 comprises a processor that consumes less power, such as a notebook processor. Advantageously, a processor that consumes less power generates less heat, thus computer 1000 remains cooler, and quieter.

In some embodiments, the computer 1000 is a small form factor (SFF) computer. A small form factor computer, in general, uses smaller motherboards, such as ITX motherboards or micro ATX motherboards. The form factor of a motherboard frequently determines the specification for the general shape and size of a computer. Also, the form factor of a motherboard may impose certain restrictions on the housing and power supply. Thus, by using smaller motherboards, the overall size of a computer can be significantly reduced. A SFF computer is desirable as it takes up less space and can be easily placed on a desk. Moreover, a SFF computer is easier to move around.

Figure 9:
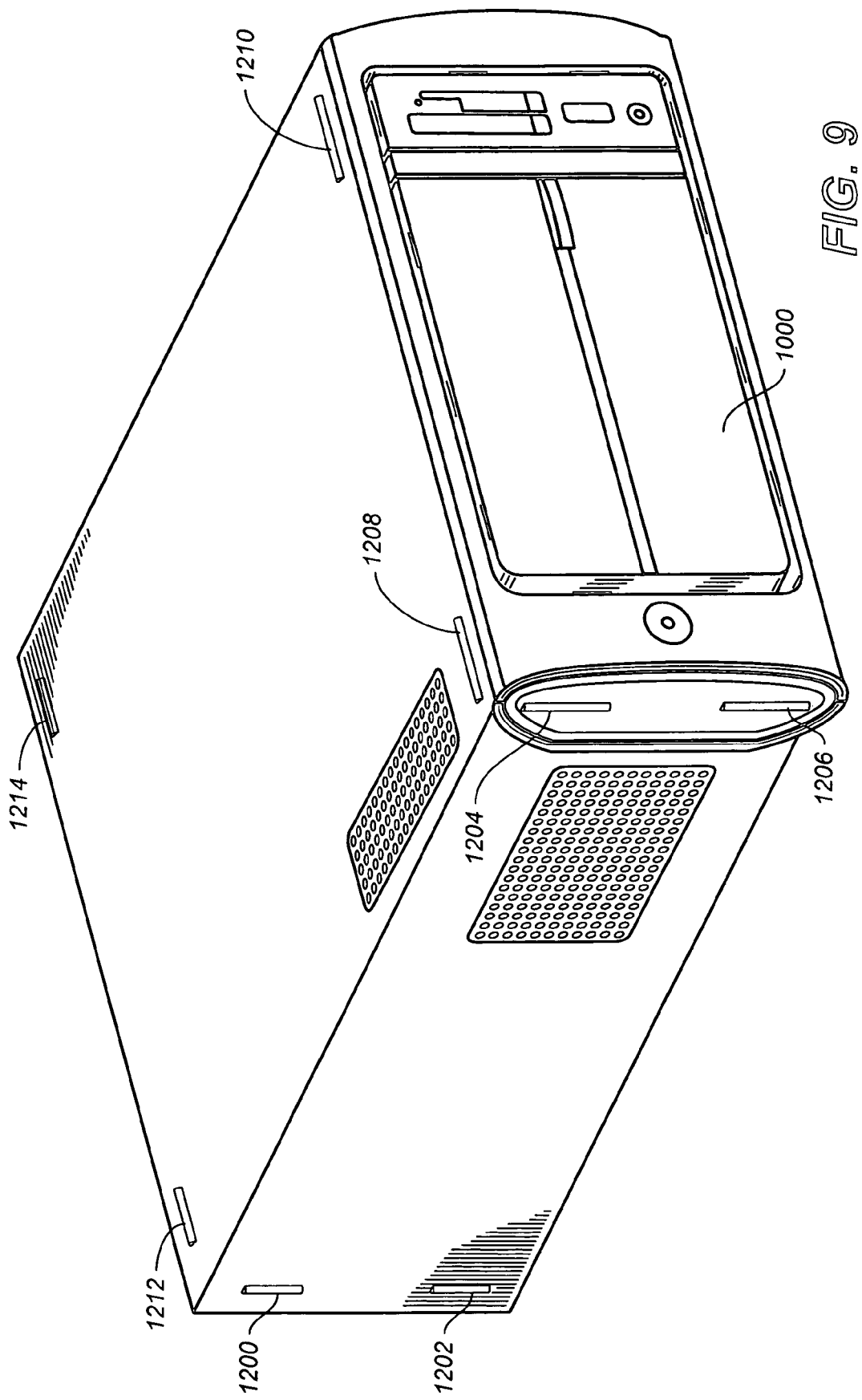
FIG. 9 illustrates a computer have a first set of feet attachments located on the bottom portion of the computer and a second set of feet attachments located on a side panel of the computer, in accordance with a particular embodiment.

As mentioned above, particular embodiments can be cooled effectively under different orientations. In some embodiments, the computer 1000 comprises a number of feet attachments located on orthogonal sides of the housing for placement of the computer 1000 into different orientations. FIG. 9 illustrates a computer 1000 have a first set of feet attachments 1200, 1202, 1204, and 1206 located on the bottom portion of the computer 1000. Also, FIG. 9 illustrates a second set of feet attachments 1208, 1210, 1212, and 1214 located on a side panel of the computer 1000. The feet attachments provide a slight elevation of surface to facilitate airflow when the computer 1000 is resting on a vent. Also, the feet attachments, in one example, help reduce transference of vibrations or movements from the computer 1000 onto a surface (e.g., a desk surface) that a user is doing work on.

Particular embodiments discussed above illustrate how a computer (e.g., a small form factor computer) can be efficiently cooled while operating in different orientations. Moreover, particular embodiments accomplish this while only generating minimal amounts of noise. As a result, the computer system is effectively cooled and produces minimal noise.

What is claimed is:

1. A fan assembly system for a computer, said fan assembly system comprising:
   a fan operable for cooling said computer; and
   a flexible fan duct coupled with said fan, wherein said fan duct comprises:
      a plurality of extension arms through which air is conveyed, the extension arms extending away from each other in a Y-shape;
      an attaching feature provided on each extension arm;
      a bow-shaped structure that, when compressed, permits the flexible fan duct to be positioned in the computer and, when released, causes the attaching features to snap lock the fan duct in place; and
      a hollow portion configured to convey air from the fan toward a component;
   wherein said flexible fan duct enables air to flow between said fan and said component to facilitate cooling of said component.

2. The fan assembly system of claim 1, wherein the bottom region of said fan duct is hollow and is configured to facilitate air flow.

3. The fan assembly system of claim 1, wherein said plurality of attaching features position said fan between a front region and a rear region of a housing of said computer.

4. The fan assembly system of claim 1, further comprising a chipset heat sink cooled by said fan.

5. The fan assembly system of claim 1 wherein the fan is operable for cooling said computer while the housing is alternatively positioned in either a horizontal orientation or a vertical orientation.

6. The fan assembly system of claim 1 wherein said fan is located in a centralized position within a housing.

7. A computer, comprising:
   a housing;
   a fan assembly residing within said housing, wherein said fan assembly comprises a flexible, Y-shaped fan duct that securely suspends said fan assembly over at least one component of said computer, wherein said suspended fan assembly facilitates cooling by allowing air to flow through a region of space between said suspended fan assembly and said at least one component;

wherein said fan duct comprises a plurality of extension arms through which air flows, each extension arm including an attaching feature, and said fan duct also comprising a bow-shaped structure that, when compressed, permits the fan duct to be positioned in the computer and, when released, causes the attaching features to snap lock the fan duct in place; and wherein the extension arms extend away from each other thereby forming the Y-shape of the fan duct.

8. The computer of claim 7, wherein said at least one component comprises a chipset heat sink of said computer.

9. The computer of claim 7 further comprising a plurality of air vents located on said housing.

10. The computer of claim 7 further comprising a plurality of feet attachments located on said housing.

11. The computer of claim 7 wherein said computer is a small form factor computer.

12. The computer of claim 7 further comprising an ITX motherboard.

13. A computer, comprising
a housing;
an optical disk drive residing within said housing;
a second component residing within said housing;
a suspended fan assembly for cooling said computer, wherein said suspended fan assembly has a flexible, Y-shaped fan duct that attaches said suspended fan assembly to said optical disk drive, wherein said attached suspended fan assembly is suspended over and not in contact with said second component, and wherein when a fan of said suspended fan assembly is operating, airflow is directed through the space between said second component and said suspended fan assembly to facilitate cooling of said second component;

wherein said fan duct comprises a plurality of extension arms through which air flows, each extension arm including an attaching feature, and said fan duct also comprising a bow-shaped structure that, when compressed, permits the fan duct to be positioned in the computer and, when released, causes the attaching features to snap lock the fan duct in place.

14. The computer of claim 13, wherein said second component is a chipset heat sink.

15. The computer of claim 13, wherein said fan duct has a hollow undersurface.

16. The computer of claim 13, wherein when said fan is operating, air is directed from said fan along said fan duct towards said second component to facilitate cooling of said second component.

17. The computer of claim 13, wherein said housing comprises a plurality of openings to facilitate cooling.

* * * * *

UNITED STATES PATENT AND TRADEMARK OFFICE
CERTIFICATE OF CORRECTION

| | | |
|---|---|---|
| PATENT NO. | : 8,390,999 B2 | Page 1 of 1 |
| APPLICATION NO. | : 11/584126 | |
| DATED | : March 5, 2013 | |
| INVENTOR(S) | : Thomas Neal et al. | |

It is certified that error appears in the above-identified patent and that said Letters Patent is hereby corrected as shown below:

On the title page, in Item [73], delete "Development," and insert -- Development Company, --, therefor.

Signed and Sealed this
Third Day of September, 2013

Teresa Stanek Rea
*Acting Director of the United States Patent and Trademark Office*